（12）United States Patent
Elchuri

(10) Patent No.: US 7,880,737 B2
(45) Date of Patent: Feb. 1, 2011

(54) GRAPHICAL METHOD AND SYSTEM FOR MAKING DRAWINGS DIRECTLY IN THREE-DIMENSIONS ON A COMPUTER MONITOR OR OTHER DISPLAY DEVICE

(76) Inventor: Vijayvardhan Elchuri, 7902 Deerlee Dr., Springfield, VA (US) 22153

( * ) Notice: Subject to any disclaimer, the term of this patent is extended or adjusted under 35 U.S.C. 154(b) by 1339 days.

(21) Appl. No.: 11/385,275

(22) Filed: Mar. 21, 2006

(65) Prior Publication Data

US 2006/0227130 A1   Oct. 12, 2006

Related U.S. Application Data

(60) Provisional application No. 60/664,228, filed on Mar. 22, 2005.

(51) Int. Cl.
*G06T 15/00* (2006.01)
(52) U.S. Cl. .................. 345/419; 345/427; 345/428; 382/154
(58) Field of Classification Search ............. 345/419, 345/427, 428; 382/154
See application file for complete search history.

(56) References Cited

U.S. PATENT DOCUMENTS

| | | | |
|---|---|---|---|
| 4,858,149 A | 8/1989 | Quarendon | |
| 5,123,087 A | 6/1992 | Newell et al. | |
| 5,455,896 A | 10/1995 | Takamura | |
| 5,490,241 A | 2/1996 | Mallgren et al. | |
| 5,621,865 A | 4/1997 | Iwamoto et al. | |
| 5,917,730 A | 6/1999 | Rittie et al. | |
| 5,923,324 A | 7/1999 | Berry et al. | |
| 5,999,187 A | 12/1999 | Dehmlow et al. | |
| 6,037,945 A | 3/2000 | Loveland | |
| 6,115,046 A | 9/2000 | Chen et al. | |
| 6,229,546 B1 | 5/2001 | Lancaster et al. | |
| 6,369,818 B1* | 4/2002 | Hoffman et al. | ............. 345/427 |
| 6,574,360 B1* | 6/2003 | Berdardini et al. | .......... 382/154 |
| 6,628,279 B1 | 9/2003 | Schell et al. | |
| 6,816,819 B1 | 11/2004 | Loveland | |
| 6,825,839 B2 | 11/2004 | Huang et al. | |
| 6,836,566 B1 | 12/2004 | Hirayama | |

* cited by examiner

*Primary Examiner*—Phu Nguyen
(74) *Attorney, Agent, or Firm*—Dennis H. Lambert, Esq.

(57) ABSTRACT

A method and system for making computer-aided drawings of an object directly in 3D. The object or its parts are bounded by m-dimensional enclosing subspaces whose boundaries are shrunk to intersect the topographical features of the enclosed object or its parts. The resulting boundary-boundary intersections define a set of key bounding dots which can be connected with mathematical entities such as lines, surfaces or solids to complete the drawing of the object or its parts. The entire drawing process is conducted directly in 3D on the display device with the user in control to view, freely rotate, move, pan, zoom, create, change or review the object anytime, akin to holding the object in hands in front, and looking over it while creating it. Drawings created by the invention can be grouped to represent assembled components, sub-assemblies, or entire systems. All or part of a drawing, if applicable, can also be grouped for structural modeling and analysis.

16 Claims, 15 Drawing Sheets

Arrangement 1 of bounding surfaces of enclosing subspace A

Arrangement 2 of bounding surfaces of enclosing subspace A'

FIG. 10
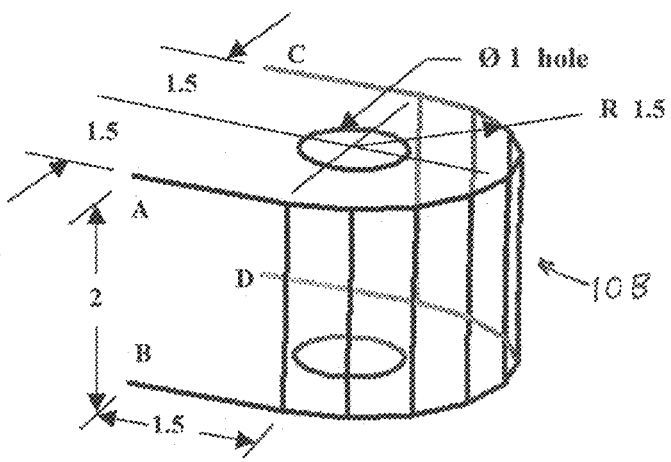
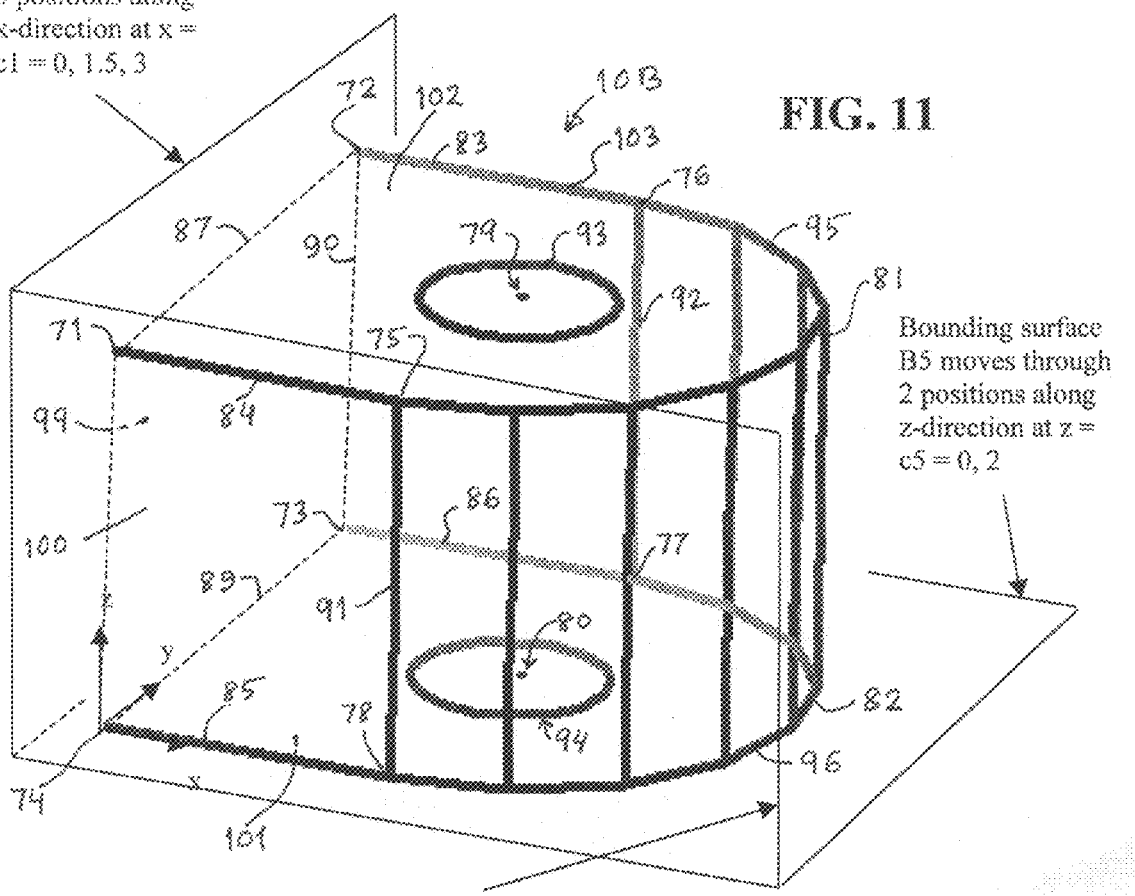
Bounding surface B1 moves through 3 positions along x-direction at x = c1 = 0, 1.5, 3
FIG. 11
Bounding surface B5 moves through 2 positions along z-direction at z = c5 = 0, 2
Bounding surface B3 moves through 3 positions along y-direction at y = c3 = 0, 1.5, 3

GRAPHICAL METHOD AND SYSTEM FOR MAKING DRAWINGS DIRECTLY IN THREE-DIMENSIONS ON A COMPUTER MONITOR OR OTHER DISPLAY DEVICE

This application claims the benefit of U.S. provisional patent application Ser. No. 60/664,228, filed Mar. 22, 2005.

TECHNICAL FIELD

This invention relates to a graphical method and system using computer programs for computer-aided design, modeling, analysis, and/or manufacturing in engineering, architectural, scientific and/or artistic fields. More specifically, the invention embodies a graphical method and system to create one-dimensional (1D), two-dimensional (2D), and/or three-dimensional (3D) drawings of designs directly in 3D on a computer monitor screen or other visual display device to perform structural modeling and analysis, mensurational analysis, and to develop data for manufacturing processes, and the like.

BACKGROUND ART

Drawings have been used for thousands of years as a means to express, document, analyze, communicate, or build. Advancements in technology have helped advance the making, saving, sharing, and utilization of drawings, while the drawings themselves continue to serve their fundamental purpose.

Due to the necessity of unambiguously representing the complexities and details of industrial designs, especially in the scientific fields of engineering and architecture, drawings have traditionally used organized methods of presenting their subjects in commonly accepted, and well understood, multiple orthogonal projection views such as front, elevation, top, plan, back, side, section and detail views. Other views, such as isometric and perspective, used chiefly for overall presentation, have also been very effective in complementing the orthogonal projection views in describing the designs. These two-dimensional projection views drawn on two-dimensional drawing media such as paper and vellum have traditionally formed the standard bases for preparing industrial design drawings.

With the advent of the first wave of personal computer (PC) technology in the 1980's, and the subsequent, slow birth of application software for bringing that hardware to practical, real world use, attempts at simulating the drawing processes in software were, of nature, based in, and primarily geared toward, the creation and development of the basic two-dimensional orthogonal projection views. The heavy demand placed on the hardware by graphics was also a significant factor in influencing the development and evolution of such design software.

Today, even though personal computer hardware and software have advanced generations beyond their ancestors from the 1980's in both capabilities and performance, much of the software leading the computer-aided design industry still relies on drawing methods and techniques founded in the creation of original two-dimensional projection views, albeit presented in fast, colorful, three-dimensional space on computer monitor screens. The use of two-dimensional drawing planes, or work planes, however freely oriented in three-dimension space, and uniformly spaced prescribed grids of lines and points on such work planes, and however freely oriented on such work planes, while functionally adequate, fundamentally represents a horizontal extension of the pre-PC drawing thought processes now executed on modern PCs. Geometry creation for real world three-dimensional objects is treated by thinking of them as a series of two-dimension sections.

It would be advantageous to have a method and system that enables one-dimensional, two-dimensional, and three-dimensional drawings to be made directly in three-dimensions on a computer monitor or other visual display device without having to first create two-dimension drawings and then project them into three-dimensional views.

DISCLOSURE OF THE INVENTION

One object of this invention is to provide a method and system for making 1D, 2D, and/or 3D drawings directly in 3D on computer monitor screens.

Another object of this invention is to embody the prescription, implementation, and demonstration of such a method and system. Thus, just as a two-dimensional drawing can be made by connecting a series of dots in two dimensions on a sheet of drawing paper, the invention provides a method and system for locating and placing a system of dots in three dimensions on a computer monitor screen, enabling a drawing to be made directly on-screen in three dimensions. The invention generates a system of dots in 3D, referred to herein as a dot-grid, to precisely bound and locate the topographical features of the object or objects being drawn, thereby representing the object(s) accurately and completely in as much detail as desired.

It is another object of this invention to provide for grouping of drawings to represent assembled components, sub-assemblies, or entire systems.

It is another object of this invention to provide for mensurational analysis. When the drawings created using the dot-grid and bounding surface system of the invention represent the designs of object(s) in sufficient detail, mensurational analysis of the object(s), or portions thereof, can be performed to obtain additional information regarding the geometric characteristics of the object(s) and their portions. Such characteristics include, but are not limited to, lengths, areas, volumes, moments, centers of gravity, radii of gyration, etc.

It is yet another object of this invention to provide for structural modeling and analysis. When the drawings created with the invention represent the designs of object(s), or portion(s) thereof in sufficient detail, and when such object(s) or their portion(s) are valid subjects for structural engineering assessment, structural modeling and analysis can be performed to obtain additional information regarding the structural characteristics of the object(s) and their portion(s). Such characteristics include, but are not limited to, stiffness, flexibility, natural modes and frequencies of vibration, static and dynamic response to loads and constraints (such as deformation, stresses, strains, margins of safety), fatigue, fracture, creep, and the like.

It is a still further object of this invention to develop such information for manufacturing. When the drawings so created represent the designs of object(s) or portion(s) thereof in sufficient detail, and when such object(s) or their portion(s) are valid subjects for manufacturing, analysis can be performed to develop additional information that is useful for manufacturing processes. Such information includes, but is not limited to, size, shape, type and quantity of raw material(s), type(s) of suitable manufacturing processes, machining tool shapes, sizes, tool paths and sequences, data for numerically controlled machines, stereo lithography, heat treatment, surface treatment, and the like.

To achieve these objects, the computer-aided system of the invention generates a dot-grid in 3D based on a number of enclosing subspaces and their boundary intersections, enclosing the object or portion thereof under consideration, to precisely bound and locate the topographical features of the object or objects being drawn, enabling the object(s) to be represented as accurately and completely and in as much detail as desired.

Objects or portions of objects can be mathematically considered as confined to or bounded within the enclosing subspace(s). The boundaries of the enclosing subspace(s) can be moved to intersect the enclosed object in any desired way. By appropriate selection of the enclosing subspaces, their boundaries, and the movement of the boundaries through the object or portion thereof under consideration, and particularly through all of the topographical features of the object, the subspace boundaries will (a) intersect the object, or object portion, at the salient points of its topographical features (such as corner points, tangent points, center points, and other like features including lines and surfaces), and (b) intersect each other. These boundary-boundary intersections are displayed as lines and dots in a grid in three-dimensions, referred to herein as a dot-grid. By connecting the dots, the user can create a drawing directly in three dimensions. Thus, the topographical features and geometric dimensions of the object can be addressed as necessary for sufficiently and precisely describing the object or portion thereof under consideration.

Broadly, the invention comprises a means for computer-aided drawing of an object of n-dimensions, where n>0, directly in three-dimensions on a display screen, by selecting a coordinate system and defining a desired number of m-dimensional enclosing subspaces, where m<n. The p-dimensional boundaries of the enclosing subspaces that enclose said object in all coordinate directions, where p<m, are moved through and placed at key coordinate locations for topographical features of the object. Key dots in the resulting dot-grid in three-dimensions are connected, thus drawing the object directly, and precisely, in three-dimensions on the display screen.

According to a particular aspect of the invention, a method is provided for making a computer-aided drawing of an object directly in three-dimensions on a display screen, comprising the steps of:

a) selecting a coordinate system;

b) determining key boundary locations in each coordinate direction of the coordinate system to define a dot-grid of key bounding dots based on topographical features of the object or portion of the object being drawn; and c) drawing directly in 3D by connecting the key bounding dots in the dot-grid.

More specifically, the invention comprises a method for making a computer-aided drawing of an object directly in three-dimensions on a display screen, comprising the steps of:

a) determining and selecting boundaries of one or more enclosing subspace(s) for the object or a portion of the object to be drawn;

b) selecting a coordinate system;

c) causing a default 3D dot-grid to show in 3D on the display screen, with default key bounding locations for each coordinate direction;

d) entering key designated bounding location coordinates for each coordinate direction, said designated bounding location coordinates corresponding to locations of key topographical features of the object or portion thereof being drawn, whereby the boundaries (points, lines and/or surfaces) move through the dot-grid and are positioned at the designated coordinates, changing the dot-grid to now represent the enclosing subspace(s) in 3D, with key bounding dots formed at locations where the boundaries intersect, said key bounding dots corresponding to corners or salient points of the topographical features of the object; and e) connecting the key bounding dots with lines, surfaces, solids, or other such mathematical entities, to draw the object or portion thereof directly in 3D on the display screen.

The invention also relates to a graphical system for making computer-aided drawings of an object directly in three-dimensions on a display screen, and particularly for making drawings directly in three-dimensions on the screen, comprising:

means for displaying in 3D on the display screen a default m-dimensional grid in a selected coordinate system, where m=1, 2, or 3; means for defining boundaries of enclosing subspace(s) that enclose the object in the selected coordinates; means for moving the boundaries along the selected coordinates and positioning them at key locations corresponding to topographical features of the object; and means for drawing lines, surfaces, solids, and other such mathematical entities between points where the boundaries intersect at the key locations, to thereby draw the object directly in 3D using said m-dimensional grid.

The invention further includes a computer program product for making computer-aided drawings of an object directly in three-dimensions on a display screen, comprising:

first instruction means for storing and displaying on a graphics display a grid of m-dimensions in a selected coordinate system; second instruction means for intersecting the grid at predetermined coordinate positions corresponding to key bounding points of an object to be drawn; and third instruction means for making lines, surfaces, solids, and other such mathematical entities that interconnect the key bounding points to draw the object directly in three-dimensions on the display screen.

The bounding subspace and dot-grid system of the invention provide greater flexibility and ease of use than existing computer-aided drawing systems. In particular, a user of the invention need specify only a fraction of the number of coordinate values that need to be specified in prior art systems in order to identify the topographical feature corner or salient points in three dimensions.

BRIEF DESCRIPTION OF THE DRAWINGS

The foregoing, as well as other objects and advantages of the invention, will become apparent from the following detailed description when taken in conjunction with the accompanying drawings, wherein like reference characters designate like parts throughout the several views, and wherein:

FIG. 10 depicts that portion of the object of FIG. 3 that is enclosed by subspace B, with physical dimensions shown.

FIG. 11 shows the planar bounding surfaces B1, B3 and B5 that bound enclosing subspace B.

FIGS. 16-18 are views of display screens embodying the system of the invention, showing an exemplary listing of menus and toolbars for this computer implementation, wherein FIGS. 16 and 17 illustrate different ways the image can be depicted (hidden lines are shown differently in these views), and wherein FIG. 18 shows a completed drawing with shading.

BEST MODE FOR CARRYING OUT THE INVENTION

Mathematical Basis:

Finite portions of finite and infinite objects, or groups of matter, in an n-dimensional space, where $n>0$, can be mathematically considered as confined to, or bounded within, one continuous enclosing subspace, or a collection of many contiguous and/or non-contiguous, overlapping and/or non-overlapping, m-dimensional enclosing subspace(s), where $m \leq n$. Examples of such objects or groups of matter include but are not limited to a spur gear in an automobile transmission assembly, the constitutive elements (protons, neutrons, electrons, etc.) of an atom of an element, the tenth floor of an eighty-story building, the sun and the planets of the solar system, and so forth.

The boundaries of such enclosing subspace(s), whether planar or non-planar, linear or non-linear, and of p-dimension, where $p<m$, when shrunk, translated, rotated, or moved and placed otherwise in any prescribed manner, both singly or multiply, can be made to intersect the enclosed portions of the object(s) in arbitrarily infinite ways.

A judicious prescription of such enclosing boundaries and their movement and placement through the enclosed portions of the object(s) under consideration can be made such as to selectively and collectively address all of the topographical features and geometric dimensions that are necessary to sufficiently and precisely describe the portions.

Figure 1:
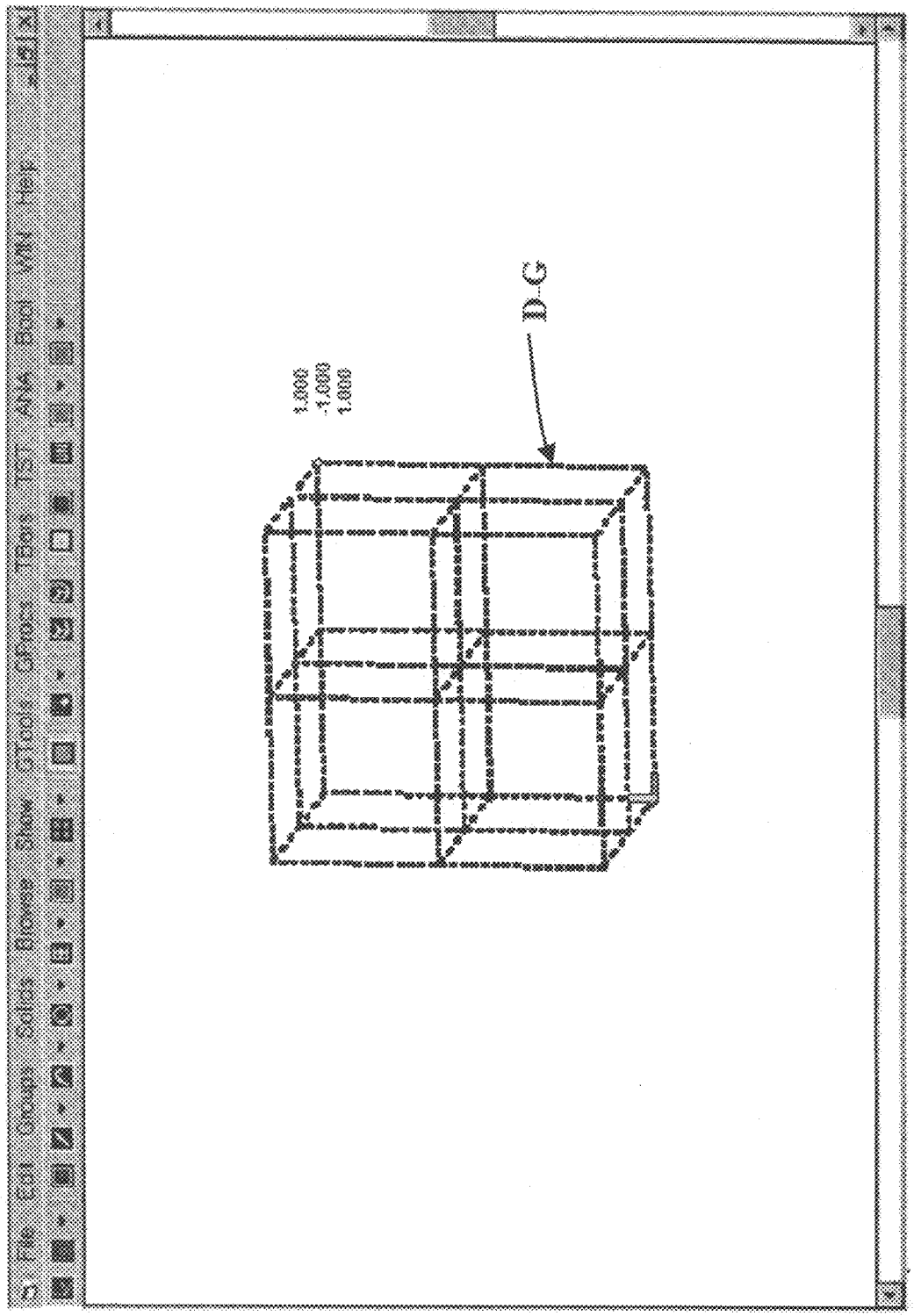
FIG. 1 depicts a screen showing a default or initial dot-grid at the beginning of a process for drawing an object.

To initiate the drawing process, the user decides upon a convenient coordinate system, such as the Cartesian coordinate system, and if a new drawing is being made a blank new sheet is opened to start drawing, as depicted in FIG. 1. A 3D dot-grid D-G shows on the screen in 3D, with default key bounding locations of −1, 0, 1 for each of the x, y and z directions. These default key bounding locations comprise starting reference locations and enable the user to precisely locate points in the dot-grid and assist in later determining which dots to connect after the bounding surfaces of the enclosing subspace are moved through the object to generate intersection points or dots that delineate the topographical features of the object being drawn.

Figure 2:
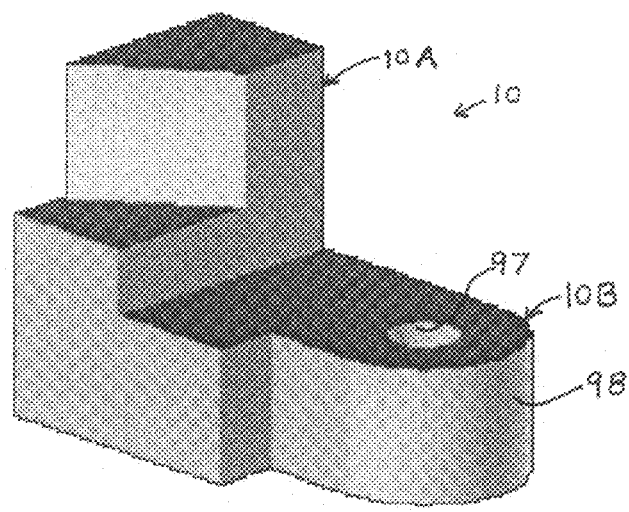
FIG. 2 is a top perspective view of a finite solid object having various topographical features.
Figure 3:
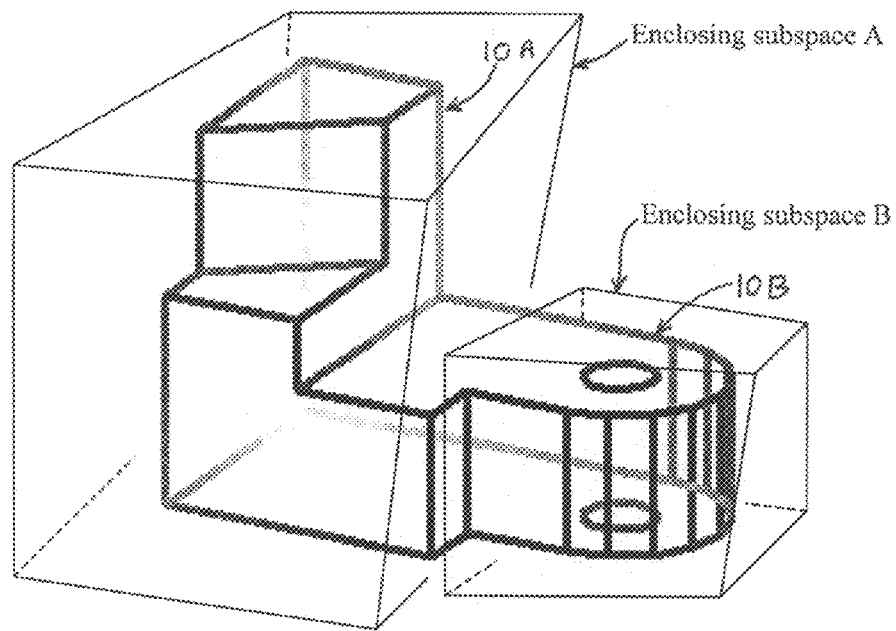
FIG. 3 depicts how the object of FIG. 2 may be related to the enclosing subspace or subspaces of the invention, and in this example two finite portions of the object are separately and entirely enclosed in two contiguous enclosing subspaces A and B.

To illustrate, FIG. 2 shows one finite solid object 10, and FIG. 3 shows the object with two finite portions 10A and 10B of it separately enclosed in two non-contiguous and non-overlapping enclosing subspaces A and B. Such selection of the enclosing subspaces, including their numbers, contiguity, and extent, is arbitrary and used here for illustration only. It is also noted that, for clarity of explanation and simplification of understanding alone, a simple object and its enclosed portions are shown in spaces where $n=3$, $m=3$, and $p=2$.

Figure 4:
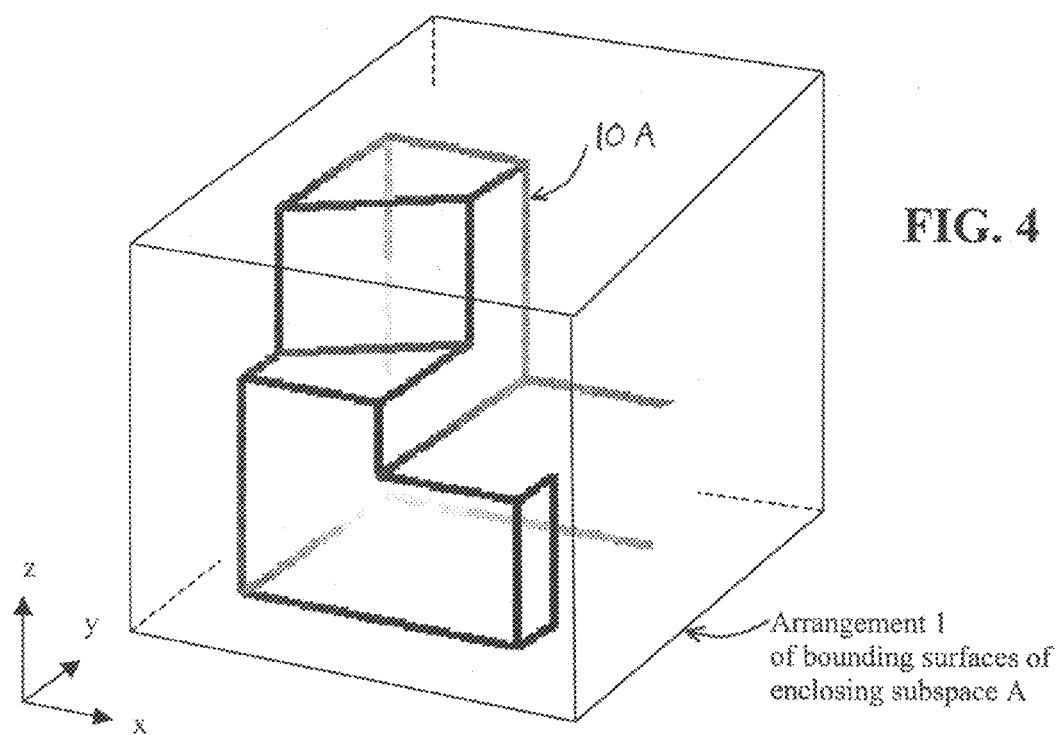
FIGS. 4 and 5 depict two of many possible arrangements for the bounding surfaces for the enclosing subspace A of FIG. 3.
Figure 5:
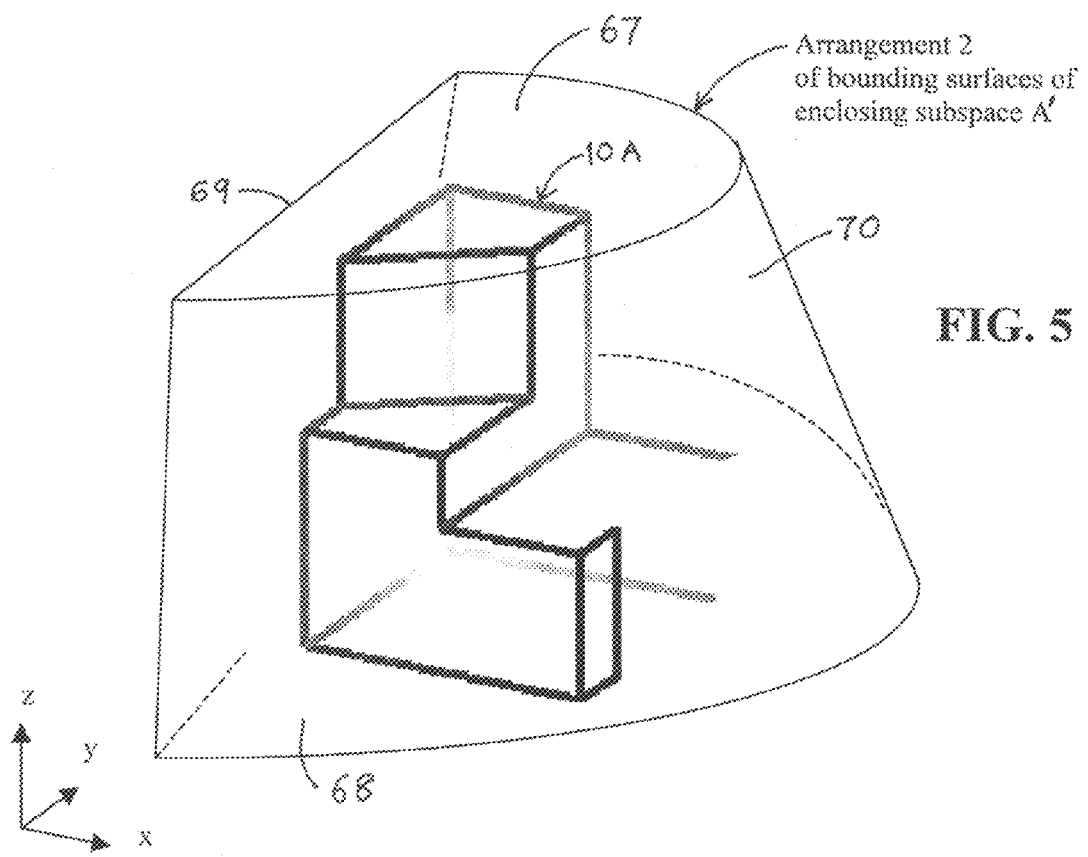
Figure 6:
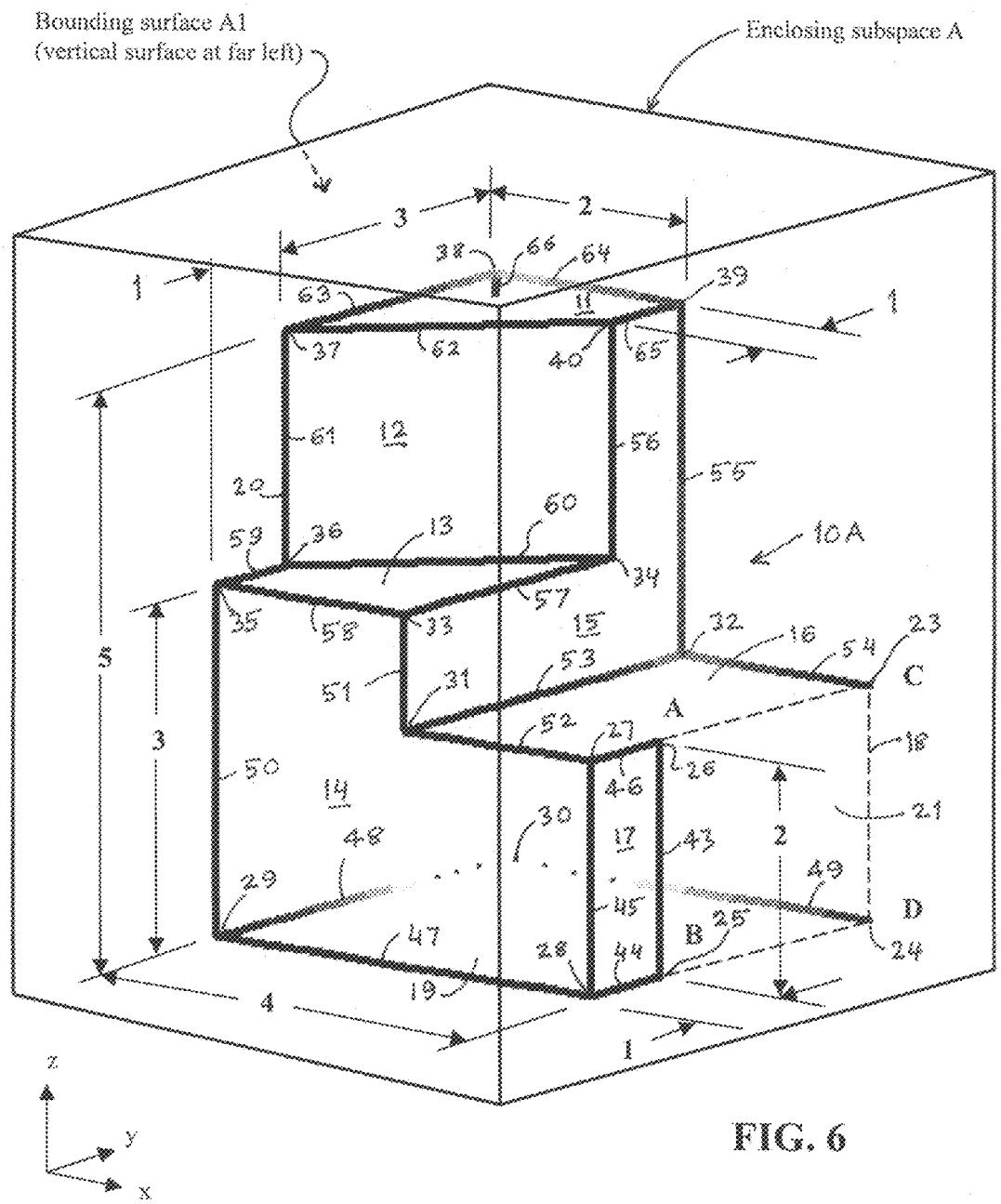
FIG. 6 is an enlarged view of that portion of the object enclosed by the enclosing subspace A, with physical dimensions shown.

Considering the enclosing subspace A first, and with particular reference to FIGS. 4 and 6, the enclosed portion 10A of the object in this example possesses 11 planar topographical features, including surfaces 11, 12, 13, 14, 15, 16, 17, 18, 19 and 20, and an imaginary surface or plane 21 where portion 10B joins portion 10A (note: surfaces 18, 19 and 20 are hidden surfaces in this view), suggesting planar bounding surfaces to bound, locate and describe such geometry. The boundary-boundary intersection points of these bounding surfaces are delineated by 18 corner points 23-40, and 26 edges 43-66, with corner points 23-26 defining the corners of plane 21, which is the common interface connecting the two object portions 10A and 10B respectively contained in the enclosing subspaces A and B. It is noted that the suggestion of planar bounding surfaces is not out of necessity but instead is a natural orientation based on the planar features of the enclosed object portion under consideration. Both planar and non-planar boundaries are equally capable of totally enclosing the object, including portion 10A. FIG. 5, for example, shows an enclosing subspace A' having a combination of planar bounding surfaces 67, 68 and 69, and a non-planar bounding surface 70.

While both of the bounding surface arrangements shown in FIGS. 4 and 5, when shrunk, would intersect the enclosed portion of the object, the enclosing subspace A of FIG. 4 is mathematically more convenient and simpler to represent in a preferentially defined system of coordinates x, y and z.

The physical dimensions indicated for the object portion 10A enclosed by the enclosing subspace A in FIG. 6 are used for illustration only and should not be considered as limiting. The invention is applicable to any system or units of measurement. The selection, location, and orientation of a Cartesian coordinate system as shown in this example are also arbitrary and for illustration. Any other coordinate system, such as cylindrical, spherical, or curvilinear can be used in practicing the invention.

Figure 7:
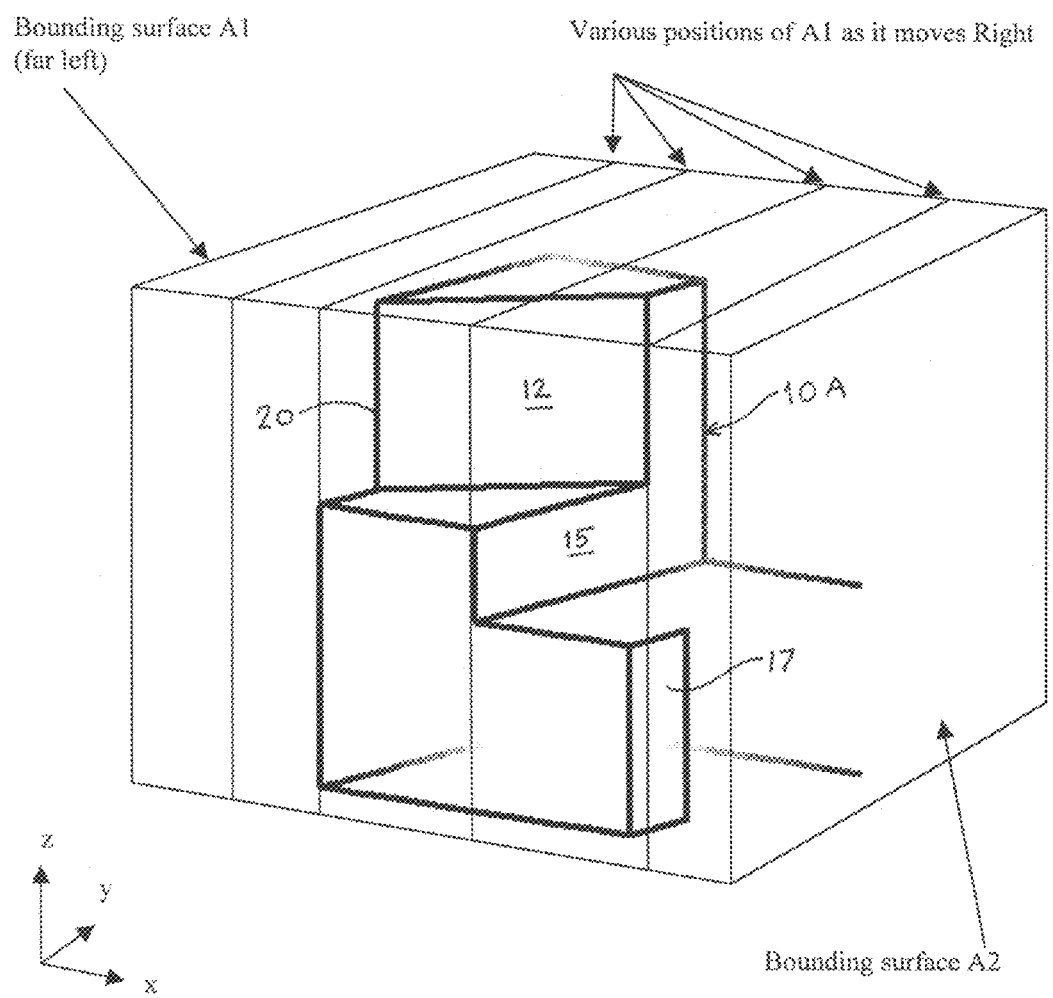
FIG. 7 illustrates the shrinking of the enclosing subspace A by moving the planar bounding surface A1 to the right.

With reference to FIG. 7, if the bounding surface A1 at the far left of the enclosing subspace A is considered as planar, mathematically represented as $x=c1$ where c1 is a selectable constant, the enclosing subspace A can be made to shrink by moving bounding surface A1 to the right by assigning various monotonically increasing coordinate values to c1, one at a time. The rest of the bounding surfaces are held in their original positions, and modified only to the extent necessitated by the movement of A1. Thus, surface A1 can be made to pass through all of the topographical features characterizing the enclosed object portion 10A. Alternatively, the planar bounding surface A2 at the far right of the enclosing subspace can be made to move to the left to locate and highlight all of the topographical features of the enclosed object portion, by monotonically decreasing c2, where $x=c2$. To extend the possibilities, both A1 and A2 can be moved simultaneously as well, and thus made to share in the effort to locate the topographical features.

Figure 8:
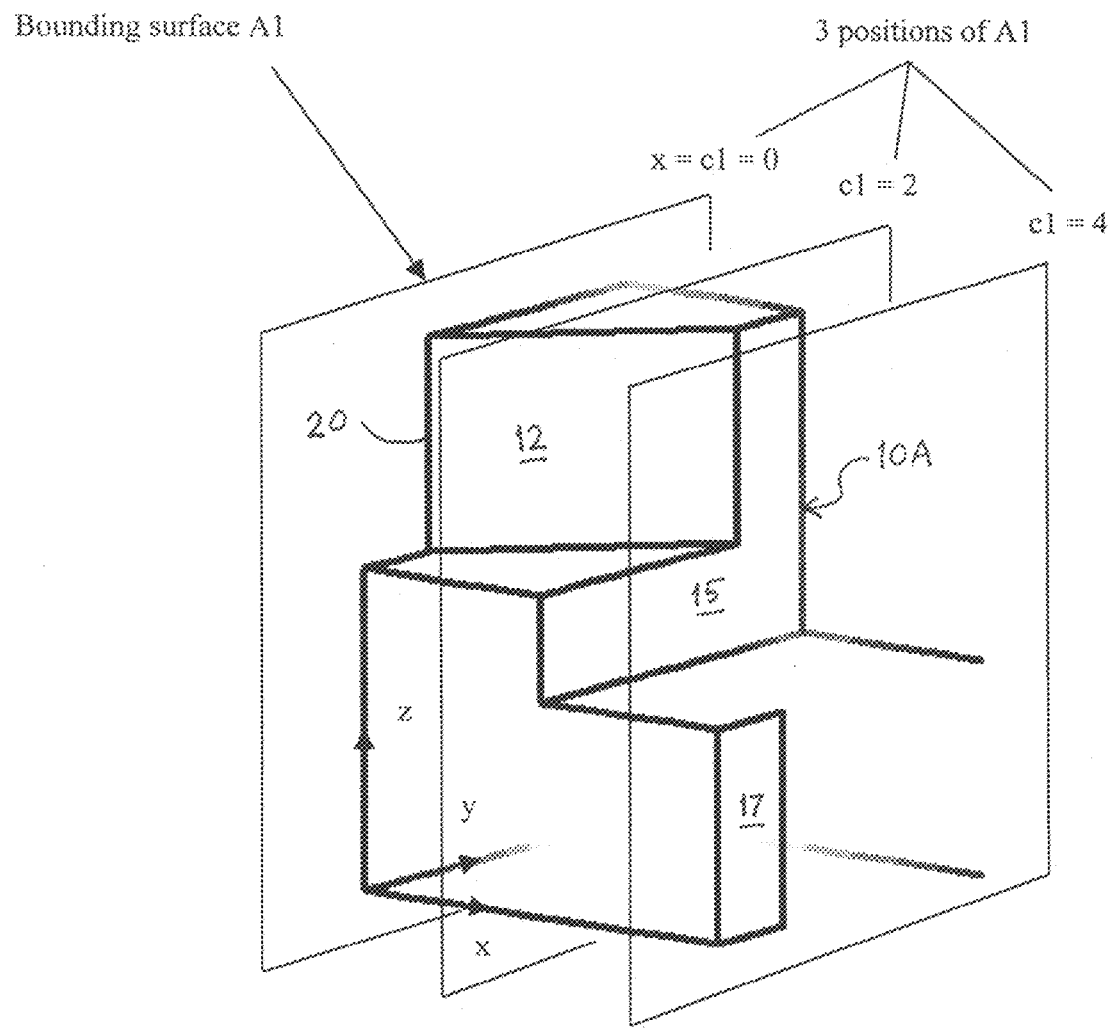
FIG. 8 shows the planar bounding surface A1 at 3 positions sufficient to locate and describe the enclosed object portion completely in the x-coordinate direction.

FIG. 8 is similar to FIG. 7, with the Cartesian coordinate system now located as shown at one of the corner points 29 of the enclosed object portion. By considering the movement of the planar bounding surface A1 specifically at x=c1=0, 2 and 4, we note that these three positions alone are sufficient to locate and describe the enclosed object portion completely in the x-coordinate direction.

Figure 9:
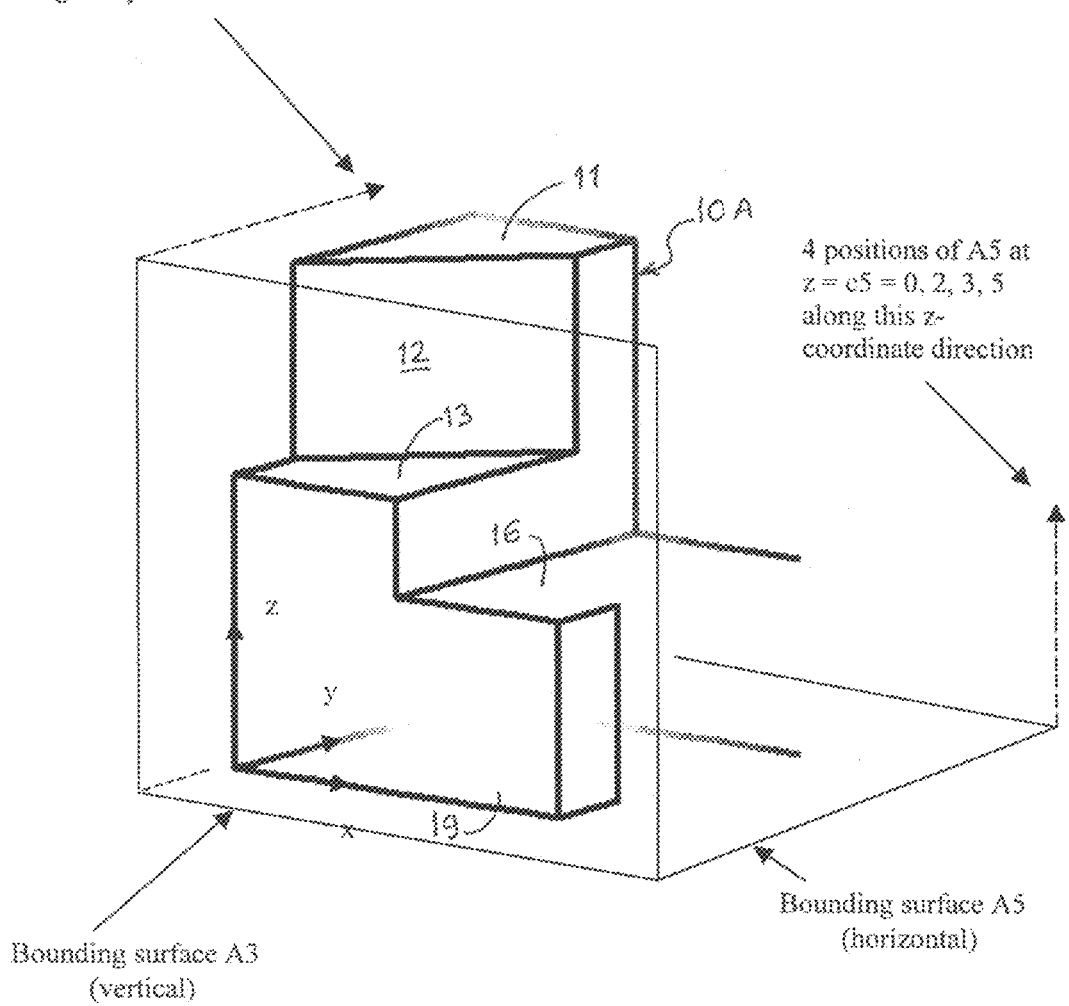
FIG. 9 shows planar bounding surfaces A3 and A5 in the y- and z-coordinate directions, respectively.

By similarly considering the bounding surfaces A3 (represented by y=c3) and A5 (represented by z=c5) of the enclosing subspace A in the y- and z-coordinate directions, respectively, as shown in FIG. 9, bounding surface A3 can be moved through y=c3=0, 1, 3 and 4 positions, and A5 moved through z=c5=0, 2, 3 and 5 positions to locate and describe the enclosed object portion completely in the y- and z-coordinate directions.

Thus, by positioning the bounding surfaces at key locations along the x, y and z axes, as determined by the measurements of the object being drawn, the points where the bounding surfaces intersect at the measured locations are the corner points of the topographical features of the object to be drawn and will appear as dots in the 3D grid. By connecting the dots, the topographical features of the object will be drawn directly in three dimensions.

An important benefit to the user of this invention is that by specifying a total of 11 coordinate values (three for c1, four for c3, and four for c5), all of the 18 corner points are completely identified for the enclosed object portion in the enclosing subspace A. This is in comparison to 18×3=54 coordinate values necessary with existing systems to identify the 18 corner points in 3D by their x, y and z 3-tuples. In this simple object example alone, this is equivalent to reducing the user input workload to nearly one-fifth of what it takes presently, netting a saving of about 400%. For more complex industrial drawings, such productivity gains would be even greater, with concomitant economic gains.

FIGS. 10 and 11 illustrate the foregoing as applied to the enclosing subspace B. The object portion 10B enclosed in subspace B has twelve corner points 71-82, ten linear edges 83-92, four curved edges 93-96 defining a closed curved surface 97 and a curved surface 98 (see FIG. 2), five plane surfaces 99-103 (with 2 of them multiply connected), all defining a multiply connected solid volume. It will be noted that the points 79 and 80 define the centers of curvature for the closed circular curved edges 93 and 94 as well as for the semi-circular curved edges 95 and 96, and the points 81 and 82 define the outer limit of the edges 95 and 96. Here also, just as for enclosing subspace A, the four points 71-74, the four edges 87-90, and the plane surface 99 between them, identify a common interface connecting the two object portions respectively contained in the enclosing subspaces A and B.

Planar bounding surfaces B1 (represented by x=c1), B3 (represented by y=c3), and B5 (represented by z=c5) are shown. All of the topographical features of the enclosed object portion 10B can be located and precisely described in all three x-, y-, z-coordinate directions by considering c1=0, 1.5, 3; c3=0, 1.5, 3; and c5=0, 2. The values of c1, c3, c5 are dependent on the selection of the coordinate system in FIGS. 10 and 11. As one alternative, for example, if the coordinate system of FIG. 8 is used to also represent B1, B3 and B5, the new values for these selectable constants would be c1=4, 5.5, 7; c3=1, 2.5, 4; and c5=0, 2.

System of Key Bounding Dots (Dot-Grid):

In order to incorporate the preceding mathematical basis in the method and system of this invention as applicable to the making of 1D, 2D and 3D drawings, in general, any object portion is considered as enclosed in an m-dimensional enclosing subspace.

For this subspace, a boundary arrangement is defined, where there are m1 key positions or locations along coordinate direction-1, m2 key locations along coordinate direction-2, mm key locations along coordinate direction-m. These boundary key positions locate the topographical features of the enclosed object portion, i.e., the m1 key positions or locations along a first coordinate direction, the m2 key locations along a second coordinate direction, and the mm key locations along coordinate direction-m.

If all possible intersections among these boundaries are considered, taking m boundaries at a time, there would result a number of m-tuple intersection points equal in number to m1*m2*m3* . . . *(mm-1)*mm, not all of which would be necessarily distinct. (The asterisk, "*", in the foregoing expression indicates multiplication.) It is also to be noted that in cases where there are no boundary key locations along a given coordinate direction (for example, if m2=0 along said direction-2 above), the number of m-tuple intersection points is assessed by dropping the contribution of that coordinate direction. That is, the number of m-tuple intersection points in such a case would equal m1*m3* . . . *(mm-1)*mm. This is likewise applicable to cases where there are multiple coordinate directions, simultaneously, with no key boundary locations. At an extreme, if there are no key boundary locations along any and all m coordinate directions, then there are no possible, still m-tuple, intersection points in the m-dimensional enclosing subspace.

A dynamic system of all such m-tuple intersection points, referred to in this invention as dots, and a systematic grid that embodies these dots, referred to herein as dot-grid, together provide the m-dimensional graphical drawing subspace, in which the user connects the m-tuple dots to create his drawings in the m-dimensional subspace while working in full 3D on the display screen as if holding the object in his hands as he creates it.

Figure 12:
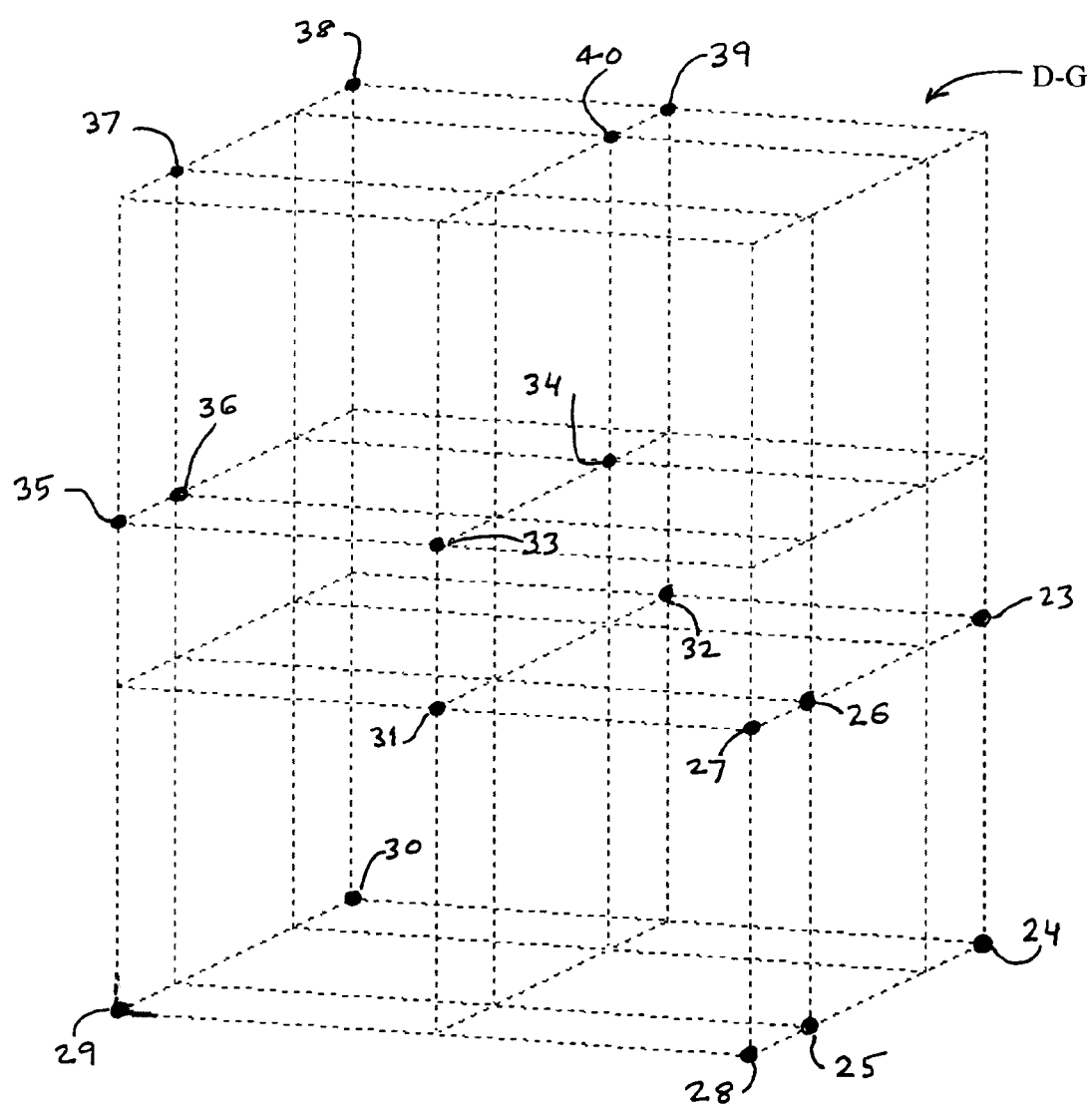
FIG. 12 shows a dot-grid of key bounding dots in 3D, produced by moving the bounding surfaces to coordinates set by the user, and representing corners or connecting points for drawing the object.
Figure 13:
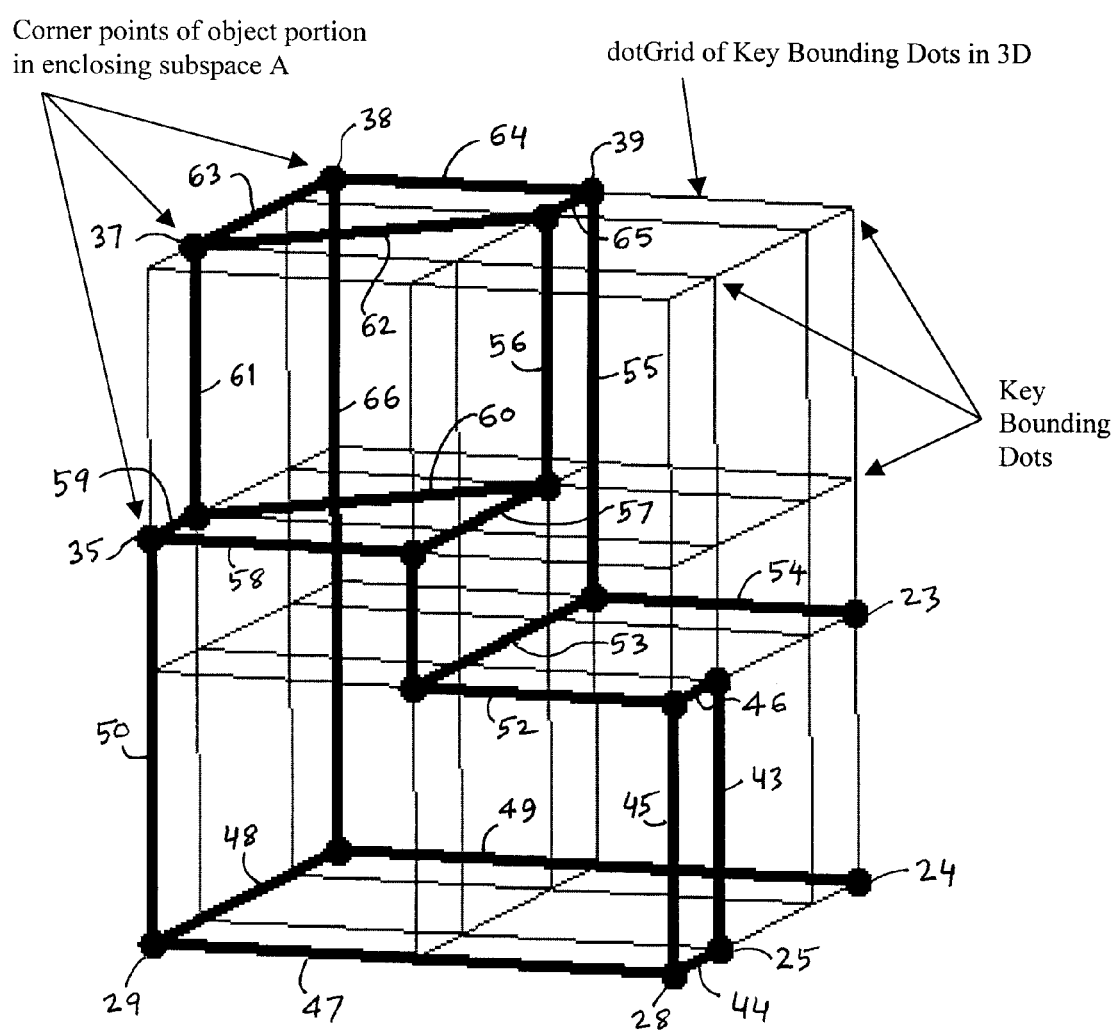
FIG. 13 shows the dot-grid of FIG. 12, and the enclosing subspace A, after the dots have been connected to draw the enclosed object portion.

To illustrate, refer to the example object of FIG. 2. Considering the object portion 10A enclosed in enclosing subspace A, FIGS. 8 and 9 show the key locations of the bounding surfaces A1, A3 and A5. A dot-grid of key bounding dots based on all possible intersections of these bounding surfaces, positioned at all of their key locations, is shown in FIG. 12. All of the 18 corner points 23-40 featuring the topography of the enclosed object portion appear as a subset of dots in this dot-grid. As shown in FIG. 13, all of them are directly accessible in the 3D graphical subspace of this dot-grid for the user to connect in any fashion or sequence to directly create a 3D drawing of the enclosed object portion.

It is another important feature of this invention that (a) the choice of the enclosing subspace, (b) its dimension m ($\leq$n), (c) its coordinate system(s) and coordinate directions, (d) its boundaries (of dimension p<m), (e) their numbers, and (f) their key positions, are entirely up to the user to define and change, at will, any time and at any stage during the drawing process, as he proceeds from drawing one portion to another, one object to another, and so on, in a free manner of his or her choosing. The dot-grid changes to his or her needs, moves to any portion of his or her choosing, and provides the pertinent m-dimensional graphical drawing subspace with m-tuple key bounding dots for direct drawing in that subspace, while always accessing it in 3D on the display screen.

Yet another beneficial feature of this invention is that the user can use the Group menu, shown in FIG. 1, to group parts of drawings to represent partially or fully assembled components, sub-assemblies, entire systems, and the like.

Such flexible control of all aspects of the dot-grid also allows the user to tailor it as needed to address even the most complex portions of his or her drawing in stages, keeping a clear, optimal, working dot-grid makeup and density at all times. This leads to an efficient, productive drawing process that is less taxing on the user.

Figure 14:
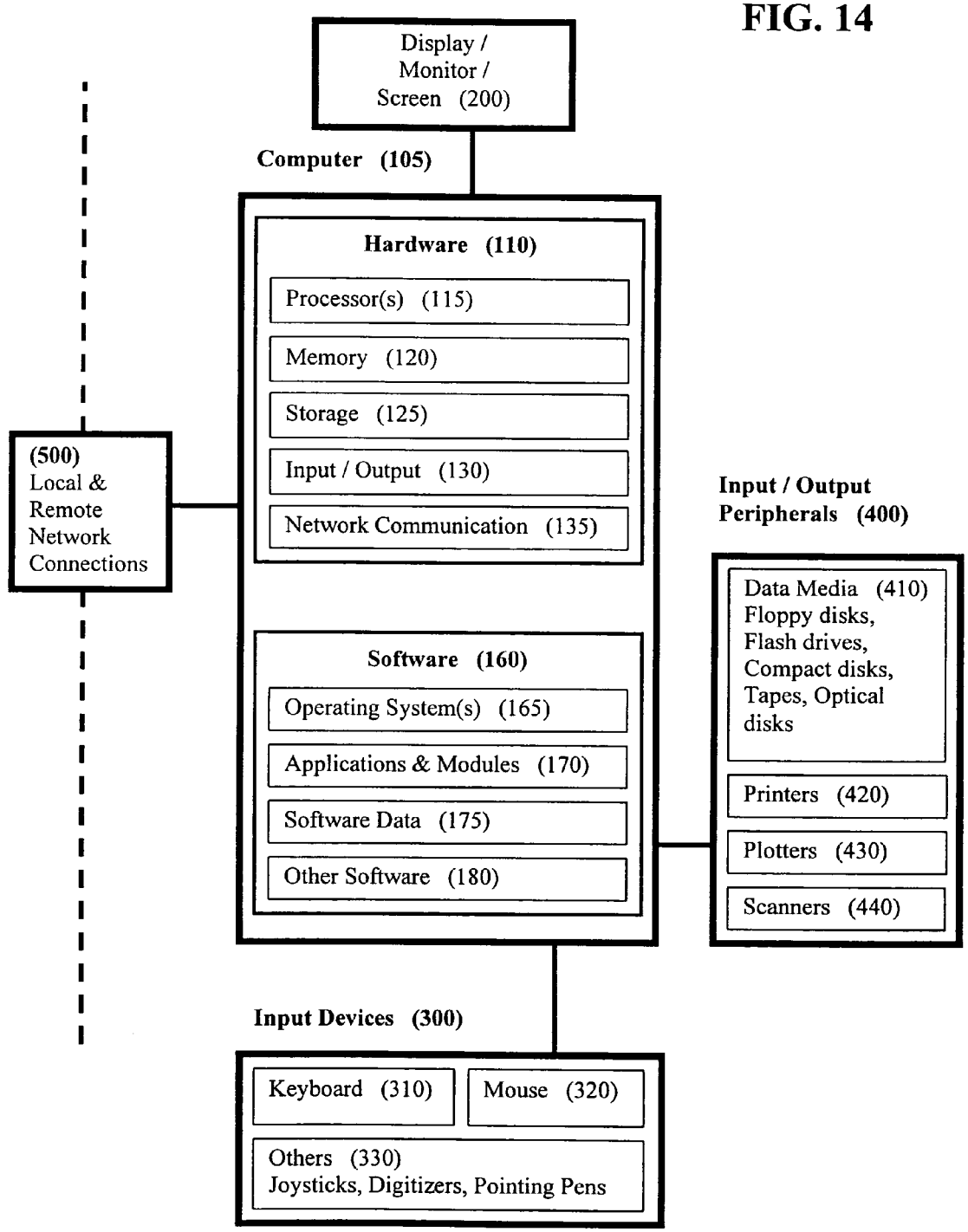
FIG. 14 is a block diagram of a generic computer system.

Computer Implementation:

The graphical method and system of this invention are programmed into computer instruction code for operation on a computer system such as that diagrammatically illustrated in FIG. 14. This diagram of a generic computer system is intended as a general description of a computing environment wherein the present invention may be purposefully utilized for its intended objects. Examples of such computer systems include personal desktop computers, portable computers such as notebooks, laptops, hand-held computers, mini-computers, computer workstations, mainframe computers, and clusters of computers connected and networked locally and/or remotely.

Referring to FIG. 14, a general purpose computing environment is described in terms of a computer 105, computer monitor or display screen(s) 200, input devices 300, other input/output peripheral devices 400, and network connections 500 to local and/or remote computing environments. The computer 105 comprises hardware 110 and software 160. Hardware 110 includes devices 115 for processing, memory 120, storage 125, input/output handling 130, and network communication 135. Software 160 includes operating system(s) 165, software applications and modules 170, software data 175, and other types of software such as firmware and drivers 180.

The computer 105 communicates with one or more computer monitor(s) or display screen(s) 200 to display the results of user actions and computer reactions. User actions are typically provided to the computer via input devices such as keyboard 310, mouse 320 and other types of input devices such as joysticks, digitizers, and pointing pens on hand-held computing devices 330. Other means of input and/or output interaction with the computer 105 include devices and media for storing and exchanging files of program and data information such as floppy disks, flash drives, compact disks, tapes, and optical disks 410, and printers 420, plotters 430 and scanners 440. Where available and applicable, the computer 105 also communicates with other local or remote computing environments and systems 500. The connections shown in FIG. 14 are logical, and may be realized by wired and/or wireless means.

Figure 15:
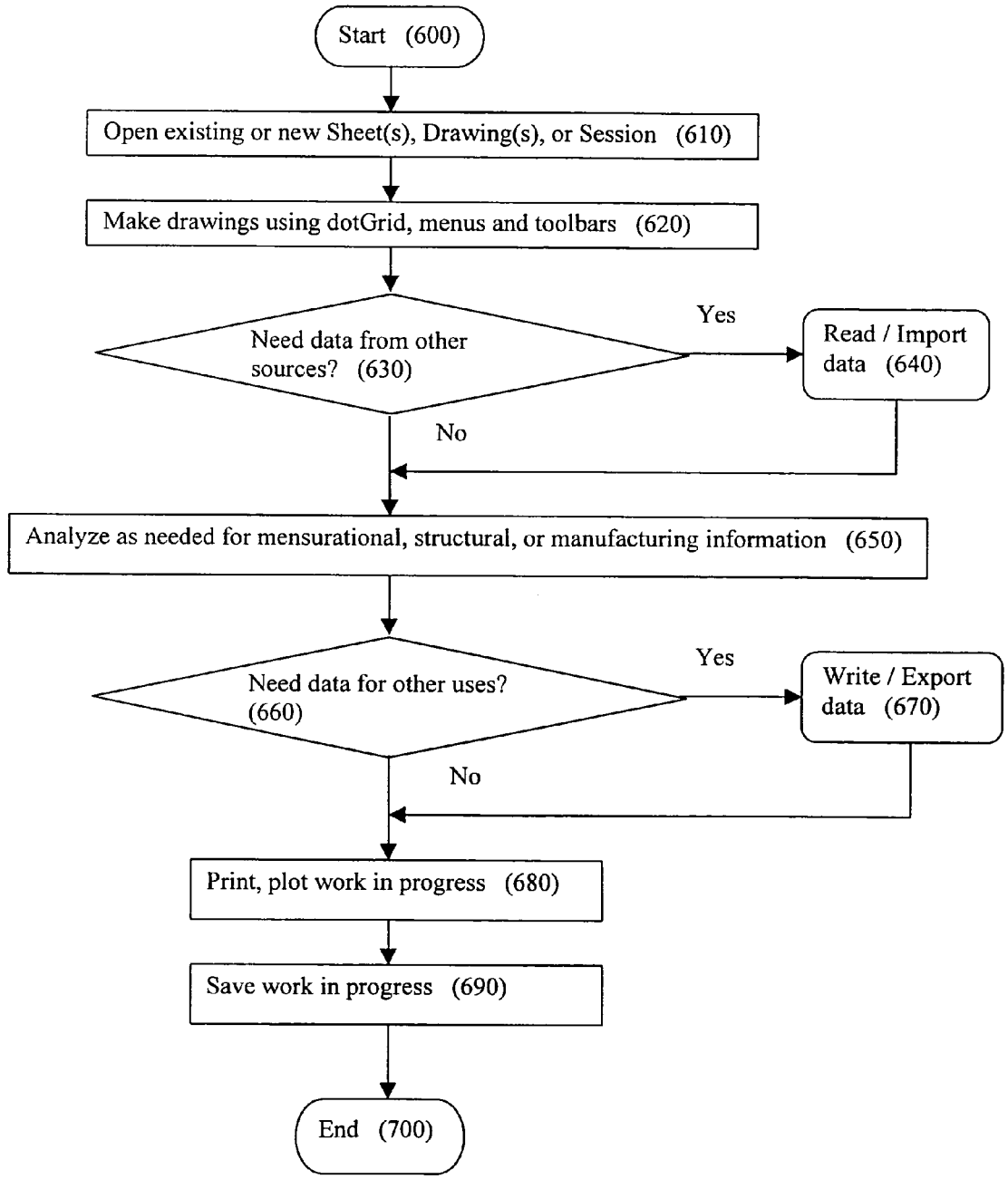
FIG. 15 is a block diagram of the overall flow of the graphical method and system of this invention.

An overview of the computer implementation of the graphical method and system of this invention is illustrated by means of a block flow diagram shown in FIG. 15. The user starts 600 the application software 160 as allowed by the computer system he is using. He or she may choose to work on existing work previously created and saved, or to start new work 610.

As a logical parallel to common industry practice, in the method and system of this invention a drawing may contain one or many sheets. The user can distinctly title and concurrently work on many sheets in a sitting, or session, with the sheets coming from one or many drawings. Opening an existing session allows the user the convenience of resuming from where he or she last left the work in progress. All sheets from all drawings that the user was working with are opened in their last working states.

The user creates the drawings of his or her 1D, 2D and/or 3D designs directly in 3D using the flexible dot-grid of key bounding dots, moving and changing it from portion to portion as the user progresses towards capturing the designs into lively drawings on the display screen.

A number of drawing facilities with menus, toolbars, guidance and help are provided to help the user with the drawing process 620 (see FIGS. 15-18). The user can freely zoom, pan and rotate the drawing in 3D at all times to focus on any part of the drawing at any time to any level of detail, just as if he were holding the object in his hands and looking it over. He can also visualize the drawings at any time as they are developed to gain different perspectives of his work using various non-interfering rendering features in color or gray scale or black and white, including spotlight rendering and fly-through animation. If during a drawing session he needs additional data or drawings or other information 630, the computer implementation provides for reading or importing those items 640.

As the facility to analyze the drawings is an integral part of this computer implementation, any portion(s) of any drawing can be selected for mensurational analysis, structural modeling and analysis, and analysis for obtaining data for manufacturing processes 650 as applicable. Such intermediate analyses can be helpful to assess the designs as they are progressively represented by the up-to-the minute state of the various drawings.

Just as the user may have a need for data or information from other sources (630, 640) during his drawing session, there may be other uses 660 that have similar needs that may be satisfied from this session. This implementation provides for writing out or exporting such data or information 670.

Printing or plotting 680 any part of the working drawing(s) in progress at any stage, saving 690 the work in progress (sheets, drawings, and/or session) before ending 700 the current session are also available to the user in this computer implementation.

It is to be noted that all computer files created by this implementation are consistent with the computing environment in which the implementation is utilized. The saving location, sharing, exchanging, backup, protection and other utilization of such files is normally addressed by the user or his organization and its policies and procedures. This implementation allows for a seamless integration with such organizational or individual preferences.

Figure 16:
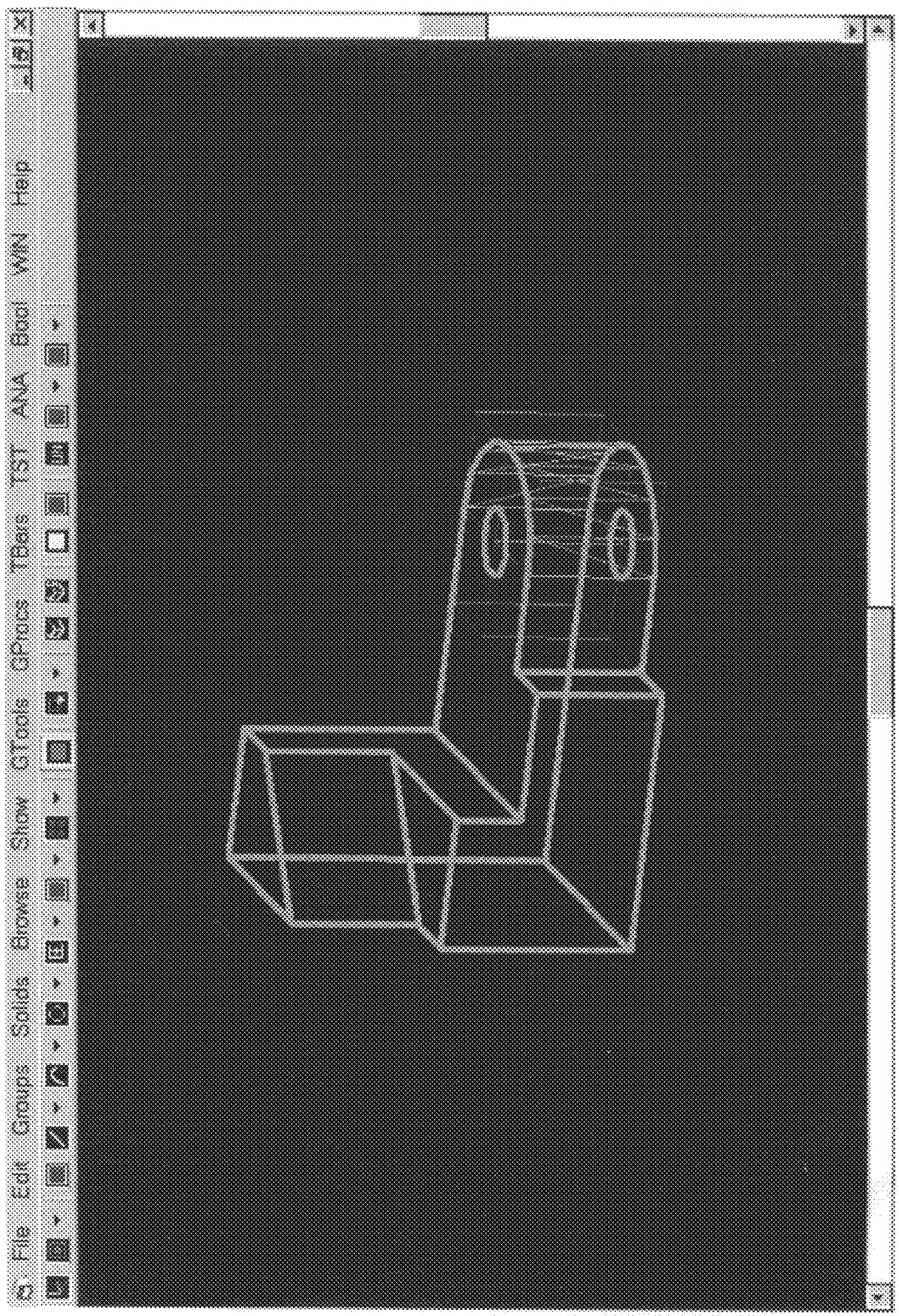
Figure 17:
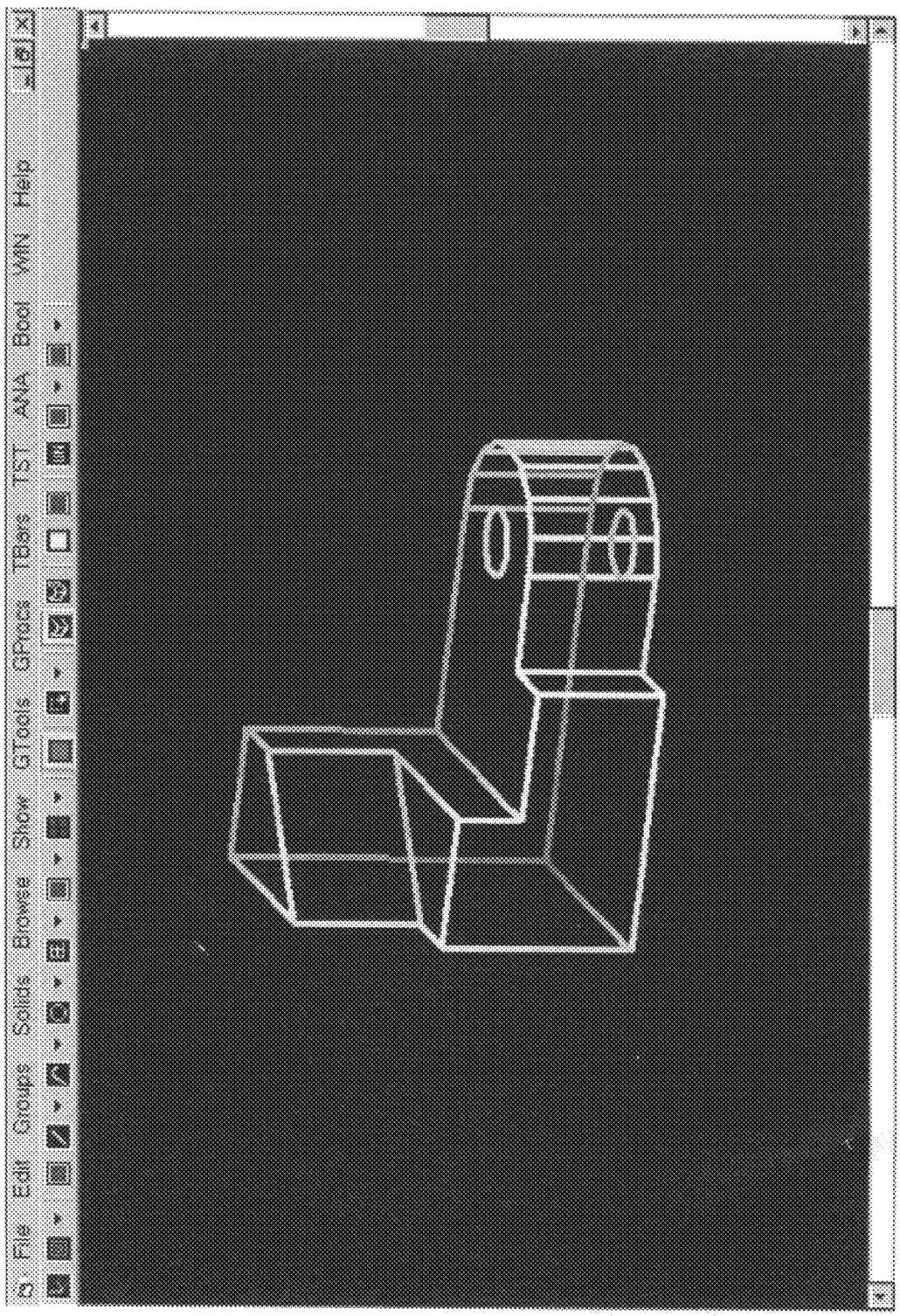
Figure 18:
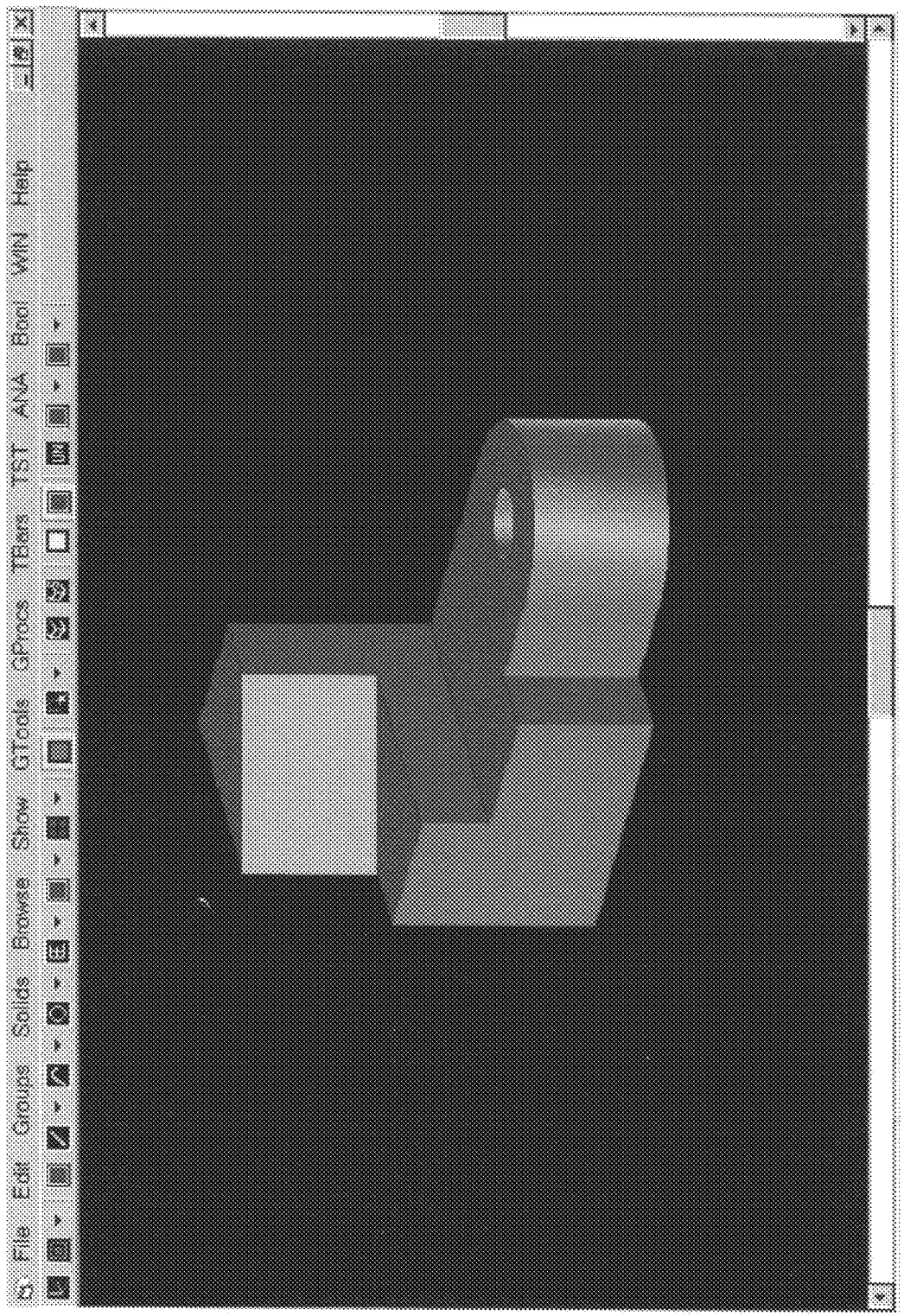

FIGS. 16, 17 and 18 show an exemplary listing of menus and toolbars for this implementation designed in an expandable modular fashion to support the objects of this invention. This exemplary listing of menus and toolbars may be embodied in other specific forms without departing from its spirit or essential characteristics. The described listing is to be considered in all respects only as illustrative and not restrictive. Users can draw several types of lines, surfaces and solids in various style, color and heaviness as applicable. Examples of lines include, and are not limited to, straight or curved lines, construction lines, parallel lines, multiple lines, offset lines, normal or perpendicular lines, tangent lines, lines at angles, arcs, circular arcs, elliptic arcs, parabolic arcs, hyperbolic arcs, curves, circles, semi circles, tangent circles, ellipses, parabolas, hyperbolas, single-valued general line functions, data point lines, and Non-Uniform Rational B-Spline (NURBS) curves. Examples of surfaces include, and are not limited to, planar and non-planar surfaces, construction surfaces, revolution surfaces, swept surfaces, ruled surfaces, extruded surfaces, holes, cylindrical surfaces, spherical surfaces, parabolic surfaces, hyperbolic surfaces, elliptical surfaces, calculated surfaces, surfaces defined from other lines and surfaces, singly and multiply connected surfaces, data point surfaces, single-valued general surface functions, and NURBS surfaces. Examples of solids include, and are not limited to, typical building-block constructive geometry solids such as boxes, cones, spheres, wedges, pyramids, cylinders, toruses, paraboloids, ellipsoids, hyperboloids, all hollow or solid, calculated solids, construction solids, solids defined from other surfaces and solids including NURBS surfaces, and singly or multiply connected solids.

Users can create such drawing objects directly on screen, or read or import externally available data to create them. Drawing aids (such as ruler, divider, protractor, highlighter, sub-divider, locator, expression calculator, coordinate system definer, undoer, redoer, dimensioner, measurers, annotators, attach-notes), facilities (such as zooming, panning, free rotation in 3D, rendered visualization, spotlight rendering, fly through animation), and multiple window management (such as cascading, tiling, arranging icons), working in conjunction with the dot-grid and key bounding dots also assist the user in creating his drawings.

Users can edit and modify such drawing objects to change them to any shape or size or location to reflect design changes any time during the drawing process. This is also applicable to NURBS drawing objects where control points, order, knot vector and weights can be changed. Objects can be selected in zones, by type, grouped, hidden, shown, moved, copied, pasted or otherwise manipulated to assist in the drawing process. Objects can also be modified by processes including but not limited to simulation of machining and forming processes, trimming, extending, rounding, chamfering, intersecting, and Boolean operations as applicable.

Users can make assembly drawings consisting of any number of sub-assemblies and parts. The sub-assembly and part drawings themselves can be further sub-divided for convenience of drawing and clarity of presentation. Any and all of these drawings may be prepared anywhere in an organization, or even in many organizations, and shared across networks such as the Internet or company intranets. A pool of approved drawings may be helpful in coordinating such sharing. Design teams could be distributed across a country or even continents and still collaborate on their designs whenever needed.

As described earlier, users can use such drawings or any of their portion(s) as applicable for mensurational analysis, structural strength assessment, and/or for manufacturing processes. Mensurational analysis facilitates calculation of geometric quantities such as lengths, areas, volumes, moments, centers of gravity, and radii of gyration which are useful in developing supplemental data for the designs represented by these drawings. For drawings that depict designs of structural objects such as buildings, bridges, aircraft, automobiles, or a kitchen blender, structural modeling and analysis can be performed to obtain additional information regarding the structural characteristics of the object(s) and their portion(s). Such characteristics include stiffness, flexibility, natural modes and frequencies of vibration, static and dynamic response to loads and constraints (such as deformation, stresses, strains, strain energies, margins of safety, failure indices, and distributions of such parameters), fatigue, fracture, and creep. With the additional knowledge of thermal and acoustic properties of the designs represented by these drawings, thermal and acoustic analyses can be performed to yield results including temperature distributions and acoustical modes. Analysis for manufacturing processes can help develop additional information for raw materials to produce the designs, such as stock size, shape and quantity, suitable manufacturing processes, machining tool shapes, sizes, tool paths and sequences, data for numerically controlled machines, data for stereo lithography to make and test model prototypes, and data for heat or surface treatment.

A Drawing Process According to A Best Mode:

Some of the likely scenarios in which users will use this invention to make drawings are:

(a) the user will have some sketches, or other drawings, or other pieces of design information, from which to put the drawings together; or (b) the user will have the designs worked out in their mind, like an artist about to paint, and are ready to directly express their thinking on the screen without the use of any helping material as in (a); or (c) the user will have found from experience that a flexible combination of the processes of (a) and (b) works best for them.

As an example, students in learning or training are likely to follow (a), while experienced designers may prefer (b) or (c).

In organizing and making a drawing, the user of the invention will:

(a) Focus on any portion of the object to be drawn. If the user considers the portion as complex, he can sub-divide it into smaller less complex portions, and then focus on these less complex portions at a time.

(b) Determine an enclosing subspace for that portion.

(c) Decide on a convenient coordinate system, and determine key boundary locations to define a dot-grid of key bounding dots based on the topographical features of the portion under consideration. Due to the flexibility of the dot-grid, it is not necessary to consider all the key boundary locations at one time. They too can be sub-divided to suit the convenience of the user.

(d) Draw directly in 3D by connecting key bounding dots in the dot-grid, as required, using any of the drawing facilities from the menus and toolbars. As the drawing progresses, portions already drawn are also directly accessible in 3D on the screen, and the user can concurrently work with these in addition to the current dot-grid.

(e) Review and save the work.

(f) Repeat steps (a) through (e), as necessary, to complete the drawing(s).

The following steps illustrate how a drawing can be made of an object, such as, e.g., the object shown in FIG. 2, using the present invention. The dimensions of this object, or more specifically its portions, are shown in FIGS. 6 and 10.

1. Start the software as per the operating system instructions for the computer (FIG. 14).

2. Click "File>Open>New Sheet" from the menu at the top to open a blank new sheet to start a new drawing. A 3D dot-grid D-G shows on the screen, as depicted in FIG. 1, with default key bounding locations of −1, 0, 1 for each of the x, y and z directions. The 3×3×3 dot-grid can be freely rotated and reviewed in 3D by freely dragging the mouse around on the screen. Moving the mouse around (without dragging) also moves a little dot through all of the key bounding dots of the dot-grid, indicating their precise coordinates in 3D. This default or initial dot-grid thus functions as a guide to help identify the precise location of each crossing point dot that results from step 3 below, and tells the user which dots to connect in order to make the drawing. As explained below, the drawing is made by connecting the key bounding dots produced in step 3 with mathematical entities such as lines, circles, arcs, curves, surfaces and solids.

3. To draw the object portion enclosed in subspace A (FIG. 6), click the 1$^{st}$ (leftmost; key XYZ's) button on the toolbar at top (FIG. 16), and enter the key bounding location coordinates for x (0, 2, 4), y (0, 1, 3, 4) and z (0, 2, 3, 5). This moves the bounding surfaces and positions them at the designated coordinates, changing the dot-grid to now represent the enclosing subspace A in 3D (FIG. 12), with key bounding locations or dots formed at the intersections of the bounding surfaces, delineating corners of topographical features of the object.

4. Click the 4$^{th}$ button on the toolbar at top (for lines), once, to begin drawing straight lines connecting key bounding dots directly in 3D on the computer screen. FIG. 12 shows the dots to be connected to draw the portion of the object enclosed by subspace A, as depicted in FIG. 13. The coordinates of the dots are identified when the cursor is positioned over or near them, enabling the user to determine which dots to connect to draw the object. Move the mouse without dragging to a key dot, click to select the beginning of a line, move it to another key dot, and click to draw the line between those two key dots. Repeat this process to draw all lines, and then click the 4$^{th}$ button, once, to end the current line drawing process. The drop-down arrow on the immediate right of the 4$^{th}$ button allows for drawing many types of straight lines, e.g., a line between two points, many lines connecting many points in sequence, tangent lines, normal lines, and so on.

5. Repeat steps 3 and 4 to similarly draw the object portion enclosed in subspace B (FIGS. 10 and 11). Circles and semi-circles are drawn using the 6$^{th}$ button on the toolbar at top. Even as the dot-grid is modified to represent subspace B in 3D, the already drawn parts of the drawing remain visible to facilitate the total drawing process.

6. Click "File>Save As>Active Sheet", and name and save the file.

7. Click the "X" button at top right to quit and close the software.

At any time in the drawing process, the dot-grid and the parts of the drawing already created can be freely rotated, reviewed and modified in 3D on the display screen. The 2$^{nd}$ button (Zoom) facilitates zooming in and out, and panning to any part of the dot-grid or the drawing. Other features of the software include, and are not limited to, visualization tools to assess the drawing in 3D as it is being developed.

The choice of the enclosing subspace, its dimension "m", its coordinate system and direction, and its boundaries and their numbers and key positions are all entirely up to the user to define and change at any time and at any stage during the drawing process as the user proceeds from one drawing portion to another, one object to another, and so on. The dot-grid changes to meet the needs of the user and provides the pertinent m-dimensional graphical drawing subspace in 3D with m-tuple key bounding dots for drawing in that subspace directly in 3D.

In the above-described best mode scenario, the users' design and drawing skills, prior experience, and preferred habits play a substantial role, albeit implicit, in the actual exercise of the drawing process. It is to be expected that variations of the best mode practice will be influenced by every user to suit his style and need.

While particular embodiments of the invention have been illustrated and described in detail herein, it should be understood that various changes and modifications may be made in the invention without departing from the spirit and scope of the invention as defined by the appended claims.

What is claimed is:

1. A computer-implemented method for making a drawing of an object directly in three-dimensions on a display screen, comprising; using a processing device to perform the steps of:
    a. determining one or more enclosing subspace(s) for the object or a portion of the object to be drawn;
    b. selecting a coordinate system;
    c. determining key boundary locations for the enclosing subspace(s) in each coordinate direction of the coordinate system to define a dot-grid of key bounding dots based on topographical features of the object or portion of the object being drawn; and
    d. drawing and displaying said object directly in 3D on said display screen by connecting the key bounding dots in the dot-grid.

2. A computer-implemented method for making a computer-aided drawing of an object directly in three-dimensions on a display screen, comprising: using a processing device to perform the steps of:
    a. determining and selecting enclosing subspace(s) and their boundaries for the object or a portion of the object to be drawn;
    b. selecting a coordinate system;
    c. causing a default 3D dot-grid to show on the display screen in 3D, with default key bounding locations for each coordinate direction;
    d. entering key designated bounding location coordinates for each coordinate direction, said designated bounding location coordinates corresponding to locations of key topographical features of the object or portion thereof being drawn, whereby the subspace boundaries move through the dot-grid and are positioned at the designated coordinates, changing the dot-grid to now represent the so-specified enclosing subspace(s) in 3D on the display screen, with key bounding dots formed at locations where the subspace boundaries intersect, said key bounding dots corresponding to corners and/or salient points of the topographical features of the object; and
    e. connecting the key bounding dots to draw the object or portion thereof directly in 3D on the display screen.

3. A method as claimed in claim 2, wherein:
the coordinates of the key bounding dots are identified when a cursor is positioned over or near them, enabling the user to determine which dots to interconnect to draw the object.

4. A method as claimed in claim 2, wherein:
the key bounding dots are connected with mathematical entities such as lines, surfaces or solids made by using a mouse to move a cursor to a first key bounding dot, clicking the mouse to select that dot, moving the cursor to a second key bounding dot to be interconnected with the first key bounding dot, and clicking the mouse to select the second dot, and repeating this process as needed to draw the mathematical entity between or at the key bounding dots.

5. A method as claimed in claim 2, wherein:
the dot-grid and the parts of the drawing already created can be freely rotated, reviewed and modified in 3D at any time in the drawing process.

6. A method as claimed in claim 2, including the steps of:
zooming in and out, and panning to any part of the dot-grid or the drawing.

7. A method as claimed in claim 2, wherein:
the choice of the enclosing subspace, its dimension "m", its coordinate system and direction, and its boundaries and their numbers and key positions are all entirely up to the user to define and change at any time and at any stage during the drawing process as the user proceeds from one drawing portion to another, and one object to another.

8. A method as claimed in claim 2, wherein:
drawings created by the invention can be grouped to represent assembled components, sub-assemblies, or entire systems.

9. A method as claimed in claim 2, wherein:
all or part of a drawing created by the invention can be grouped for structural modeling and analysis.

10. A graphical system for making computer-aided drawings of an object of n-dimension, where n>0, in an m-dimensional dot-grid in 3D on a display screen, where m≦n, comprising a processing device having:
  means for displaying on the display screen a default m-dimensional dot-grid in 3D in a selected coordinate system;
  means for defining enclosing subspace boundaries of p-dimension, where p<m, and wherein the boundaries enclose the object in the selected coordinates;
  means for moving the boundaries along the selected coordinates and positioning them at key locations corresponding to the locations of topographical features of the object, thereby changing the dot-grid; and
  means for drawing lines, surfaces, solids, or other mathematical entities between or at points where the boundaries intersect at the key locations, to thereby draw the object directly in said m-dimensional dot-grid in 3D on the display screen.

11. A system as claimed in claim 10, wherein:
m=3, n=3, and p=2.

12. A system as claimed in claim 10, wherein:
the points where the bounding surfaces intersect define bounding points for the topographical features of the object.

13. A system as claimed in claim 10, wherein:
m=3, n=3, and p=2; and
the points where the bounding surfaces intersect define bounding points for the topographical features of the object.

14. A computer program product stored on a computer-readable medium and executed by a processor for making computer-aided drawings of an object directly in three-dimensions on a display screen, said computer program product comprising:
  first instruction means for storing and displaying on a graphics display a grid of m-dimensions in 3D in a selected coordinate system;
  second instruction means for intersecting the grid at predetermined coordinate positions corresponding to key bounding points of an object to be drawn; and
  third instruction means for making lines, surfaces, solids or other mathematical entities that interconnect the key bounding points to draw the object directly in three-dimensions on the display screen.

15. A computer-readable medium storing computer program instructions operable to:
  a. determine one or more enclosing subspace(s) for the object or a portion of the object to be drawn;
  b. select a coordinate system;
  c. determine key boundary locations for the enclosing subspace(s) in each coordinate direction of the coordinate system to define a dot-grid of key bounding dots based on topographical features of the object or portion of the object being drawn; and
  d. draw and display said object directly in 3D on said display screen by connecting the key bounding dots in the dot-grid.

16. A computer program product comprising a computer readable medium having computer readable program code thereon configured to cause a computer to make a drawing of an object directly in three-dimensions on a display screen, said computer readable program code comprising:
  computer readable program code configured to cause said computer to display on the display screen a default m-dimensional dot-grid in 3D in a selected coordinate system;
  computer readable program code configured to define enclosing subspace boundaries of p-dimension, where p<m, and wherein the boundaries enclose the object in the selected coordinates;
  computer readable program code configured to move the boundaries along the selected coordinates and positioning them at key locations corresponding to the locations of topographical features of the object, thereby changing the dot-grid; and
  computer readable program code configured to draw lines, surfaces, solids, or other mathematical entities between or at points where the boundaries intersect at the key locations, to thereby draw the object directly in said m-dimensional dot-grid in 3D on the display screen.

* * * * *